(12) United States Patent
Mall (10) Patent No.: US 7,886,415 B2
(45) Date of Patent: Feb. 15, 2011

(54) MACHINE TOOL (75) Inventor: Johann Mall, Furstenfeldbruck (DE)

(73) Assignee: The Gleason Works, Rochester, NY (US)

( * ) Notice: Subject to any disclaimer, the term of this patent is extended or adjusted under 35 U.S.C. 154(b) by 911 days.

(21) Appl. No.: 11/820,141

(22) Filed: Jun. 18, 2007

(65) Prior Publication Data
US 2007/0297115 A1 Dec. 27, 2007

(30) Foreign Application Priority Data
Jun. 23, 2006 (DE) .................. 10 2006 028 929
May 31, 2007 (DE) .................. 10 2007 025 321

(51) Int. Cl.
B23Q 5/34 (2006.01)
B23Q 11/10 (2006.01)

(52) U.S. Cl. .................. 29/26 R; 408/61; 408/4; 408/234; 409/235; 409/241; 74/125.5

(58) Field of Classification Search ......... 409/135–136, 409/235, 241; 408/56, 4, 60, 61, 234, 17; 74/88, 110, 120, 125.5, 144, 148, 162; 29/26 A, 29/26 R; B23Q 5/34, 5/50
See application file for complete search history.

(56) References Cited
U.S. PATENT DOCUMENTS
3,172,297 A * 3/1965 Thiene .................. 74/148
3,548,711 A * 12/1970 Baldwin .................. 409/185
4,084,461 A 4/1978 Champeau et al.
4,421,441 A * 12/1983 Hirose .................. 408/17
4,961,675 A * 10/1990 Stewart .................. 408/1 R
5,073,068 A * 12/1991 Jinkins et al. .................. 408/17
5,533,842 A * 7/1996 Johnson et al. .................. 408/17

FOREIGN PATENT DOCUMENTS
DE 2714402 10/1977
DE 19649322 A1 6/1998

OTHER PUBLICATIONS
European Search and Examination Report for EP 07011697.5 (with English translation).

* cited by examiner

Primary Examiner—Daniel W Howell
(74) Attorney, Agent, or Firm—Robert L. McDowell (57) ABSTRACT In a machine tool with at least two axes of movement (2, 7) defining, respectively, the mobility of a first function-supporting unit (1) and of a second function-supporting unit (5), only the first function-supporting unit (1) is provided with its own servo drive, while the second function-supporting unit (5) is driven by the movement of the first function-supporting unit (1) through a coupler unit (13) that can be switched between an engaged and a disengaged state.

23 Claims, 4 Drawing Sheets

MACHINE TOOL

FIELD OF THE INVENTION

The invention relates to a machine tool with a base, a first and a second axis of movement, a first function-supporting unit which by means of a first displacement-actuator unit powered by a drive motor responsive to controls is enabled to move relative to the base in accordance with a first displacement path corresponding to the first axis of movement, and with a second function-supporting unit which by means of a second displacement-actuator unit is enabled to move in accordance with a second displacement path corresponding to the second axis of movement.

BACKGROUND OF THE INVENTION

Secured to the function-supporting units in this kind of machine tool are in particular work pieces such as for example gear blanks or rough-cut gears, and tools such as for example mill cutters or grinding worms. By moving the function-supporting units according to their axes of movement, the engagement between the tool and the work piece is established as required by the work process being performed. The displacement-actuator units which drive the function-supporting units according to their respective axes of movement are normally equipped with a dedicated controlled drive motor for each axis of movement. With the respective displacements of the function-supporting units resulting from the control of the drive motors, the relative movement between the tool and the work piece as required for the work process being performed is set with the requisite high degree of accuracy. Another function-supporting unit can serve for example as carrier for a spray nozzle to deliver a cooling agent to the process zone. Due to the mobility of this function-supporting unit, the distance to the tool or to the work piece can be set as desired. However, providing each axis of movement with its own dedicated controlled drive motor makes the machine tool expensive to manufacture.

In view of this problem, the invention has the objective to provide a machine tool of the kind outlined at the beginning, which will have the same functionality but will be less expensive to build.

SUMMARY OF THE INVENTION

According to the invention, this objective is met through a concept where the second displacement-actuator unit has a first coupler unit that can be switched between an engaged and a disengaged state, where the second displacement-actuator unit further has a drive-input section which in the engaged state of the first coupler unit is enabled to be driven by the movement of the first function-supporting unit as the latter is being displaced along the first displacement path, and where the second displacement-actuator unit further has a drive-output section which is driven by the drive-input section and through which the second function-supporting unit is driven for displacement along the second displacement path.

The invention will be explained hereinafter in more detail with references to the drawings.

DETAILED DESCRIPTION OF THE PREFERRED EMBODIMENTS

The invention begins with the observation that axes of movement, unless they represent completely independent degrees of freedom, do not necessarily have to be served by individual drive mechanisms with dedicated drive motors. Rather, according to the invention, a dedicated drive motor for the second function-supporting unit is dispensed with, and the power to move the second function-supporting unit is derived from the movement of the first function-supporting unit which is driven by its controlled drive motor. Under this concept, when the first coupler unit is in its engaged state, the second displacement-actuator unit at its drive-output section translates the movement introduced at its drive-input section from the first function-supporting unit into a movement of the second function-supporting unit. On the other hand, when the first coupler unit is switched to its disengaged condition, the second function-supporting unit remains in the position corresponding to the second displacement path traveled up to the moment of disengagement.

Thus, the design configuration according to the invention meets many requirements in machine tools in cases where it is not necessary at all times to move the second function-supporting unit independently of the first function-supporting unit. For example, in a machine tool configured according to the invention, the second displacement path of the second function-supporting unit can be the exact opposite of the first displacement path of the first function-supporting unit, so that if the second function-supporting unit is arranged on the first function-supporting unit, the second function-supporting unit will be kept at rest in relation to the base of the machine. On the other hand, it is possible through appropriate switching of the first coupler unit to temporarily produce relative movements and thus relative position changes between the first function-supporting unit and the second function-supporting unit which is arranged on the first function-supporting unit.

The inventive concept can be employed particularly in the case where the first axis of movement is an axis of linear movement. In this case, when the first coupler unit is in its engaged state, the drive-input section of the second displacement-actuator unit shares the linear displacement of the first function-supporting unit.

A further advantageous embodiment is based on the concept that the second displacement-actuator unit includes a second coupler unit which can be switched in the opposite sense of the first coupler unit between an engaged state in which the second displacement-actuator unit is locked and a disengaged state in which the second displacement-actuator unit is released for driving movement. Thus, the second coupler unit locks the second function-supporting unit in the position that corresponds to the second displacement which has occurred up to the moment of disengagement of the first coupler unit. This serves to ensure that this position is maintained also in the presence of unsettling forces until the second coupler unit is disengaged and the first coupler unit returned to the engaged state so that the drive power derived from the first function-supporting unit is again energizing the second function-supporting unit.

According to an important embodiment of the invention, the drive-input section and the drive-output section of the second displacement-actuator unit are axially spaced-apart portions of a rigid rod whose longitudinal axis runs parallel to the axis of linear movement. In the engaged state of the first coupler unit, this rod is either pushed or pulled along by the first function-supporting unit depending on the direction in which the latter is moving, and through this displacement movement, the rod provides the required moving power to drive the second function-supporting unit.

As a practical measure, the first coupler unit comprises a clamping element in which the portion of the rod that forms the drive-input section can be firmly clamped in the engaged condition of the first coupler unit. This configuration of the first coupler unit is distinguished by its high reliability in operation and by its simple construction. Analogous advantages can be gained with a concept where the second coupler unit comprises a clamping element in which the section of the rod that forms the drive-output section can be firmly clamped in the engaged condition of the second coupler unit.

According to another concept of the invention, the drive-input section and the drive-output section of the second displacement-actuator unit are each formed by a piston-cylinder unit that is actuated by a pressure medium and has a piston rod which is connected to its piston and protrudes from the cylinder, wherein the chambers separated from each other by the piston in each cylinder are connected to the respective chambers of the other cylinder by pressure-fluid conduits extending between the two piston cylinder units.

Since corresponding chambers of the cylinders in this arrangement are connected to each other by the pressure-fluid conduits, a movement introduced into the piston rod of one piston-cylinder unit effects a displacement of the pressure medium and thereby causes the piston and thus also the piston rod of the other piston-cylinder unit to move by a commensurate degree. If the two cylinders have equal internal cross-sectional areas, the two piston rods move by equal amounts of displacement.

It is in particular of practical significance that the piston rod of the piston-cylinder unit which forms the drive-input section extends parallel to the axis of linear movement.

As a possible arrangement for introducing the motive power into the second displacement-actuator unit, the piston-cylinder unit that forms the drive-input section is mounted on the first function-supporting unit and the first coupler unit is mounted on the base of the machine. Alternatively, it is also possible for the piston-cylinder unit that forms the drive-input section to be mounted on the base of the machine and the first coupler unit to be mounted on the first function-supporting unit.

As in the previously described embodiments where the second displacement-actuator unit includes the rod, it is also practical in the embodiments with piston-cylinder units if the first coupler unit comprises a clamping element in which the piston rod of the piston-cylinder unit that forms the drive-input section can be firmly clamped in the engaged condition of the first coupler unit, and/or if the second coupler unit comprises a clamping element in which the piston rod of the piston-cylinder unit that forms the drive-output section can be firmly clamped in the engaged condition of the second coupler unit.

The inventive concept can be employed particularly in the case where the second axis of movement is an axis of linear movement.

It is also possible that a transmission mechanism is arranged between the second function-supporting unit and the drive-output section to change the direction or length of displacement of the drive-output section.

As an example of an important application of the invention, a tool is arranged on the first function-supporting unit and a coolant nozzle on the second function-supporting unit. As the movement of the second function-supporting unit can be derived from movement of the first function-supporting unit, the distance of the coolant nozzle from the tool can be optimally adjusted. This particularly important in the case where the tool, for example a grinding worm becomes continuously smaller in its radial dimension over its operating lifetime due to wear and subsequent trimming, so that the distance of the coolant nozzle has to be readjusted accordingly.

It is characteristic of many applications that the first and second function-supporting units are constituted by a first and a second movably supported carriage. This includes in particular the possibility that the first carriage is movably supported on the base of the machine and/or the second carriage is movably supported on the first carriage.

In this case, the first carriage can for example be a tool-holding carriage and the second carriage can serve to hold a coolant nozzle. By using the second displacement-actuator unit with the two piston-cylinder unit it is possible to achieve opposite displacements of equal magnitude for the two carriages, so that the second carriage which carries the coolant nozzle remains stationary relative to the base of the machine in spite of the work-related movements of the first carriage, and thus the second carriage stays in place relative to a work piece carrier that has a stationary position on the base of the machine.

With the coupler units that are switchable in the opposite sense of each other, it is also possible to change the position of the second carriage relative to the base of the machine if needed. To accomplish this, the piston rod of the piston-cylinder unit that forms the drive-input section can be clamped in place by the second coupler device, while the first coupler unit, which effects the clamping of this piston rod to the base of the machine or to the tool-holding carriage, as the case may be, is switched to its disengaged state whereby its clamp hold is released. In this operating state of the two clamping devices, the second carriage is moved together with the tool-holding carriage. The very precisely operating first displacement-actuator device of the tool-holding carriage can in this case be used for the positioning of the second carriage. Once the second carriage has reached the prescribed position relative to the stationary work piece carrier or to the work piece arranged on it, the switching states are changed between the two couplers, so that independent of the movement of the tool-holding carriage, the second carriage remains stationary relative to the work piece carrier.

Figure 1:
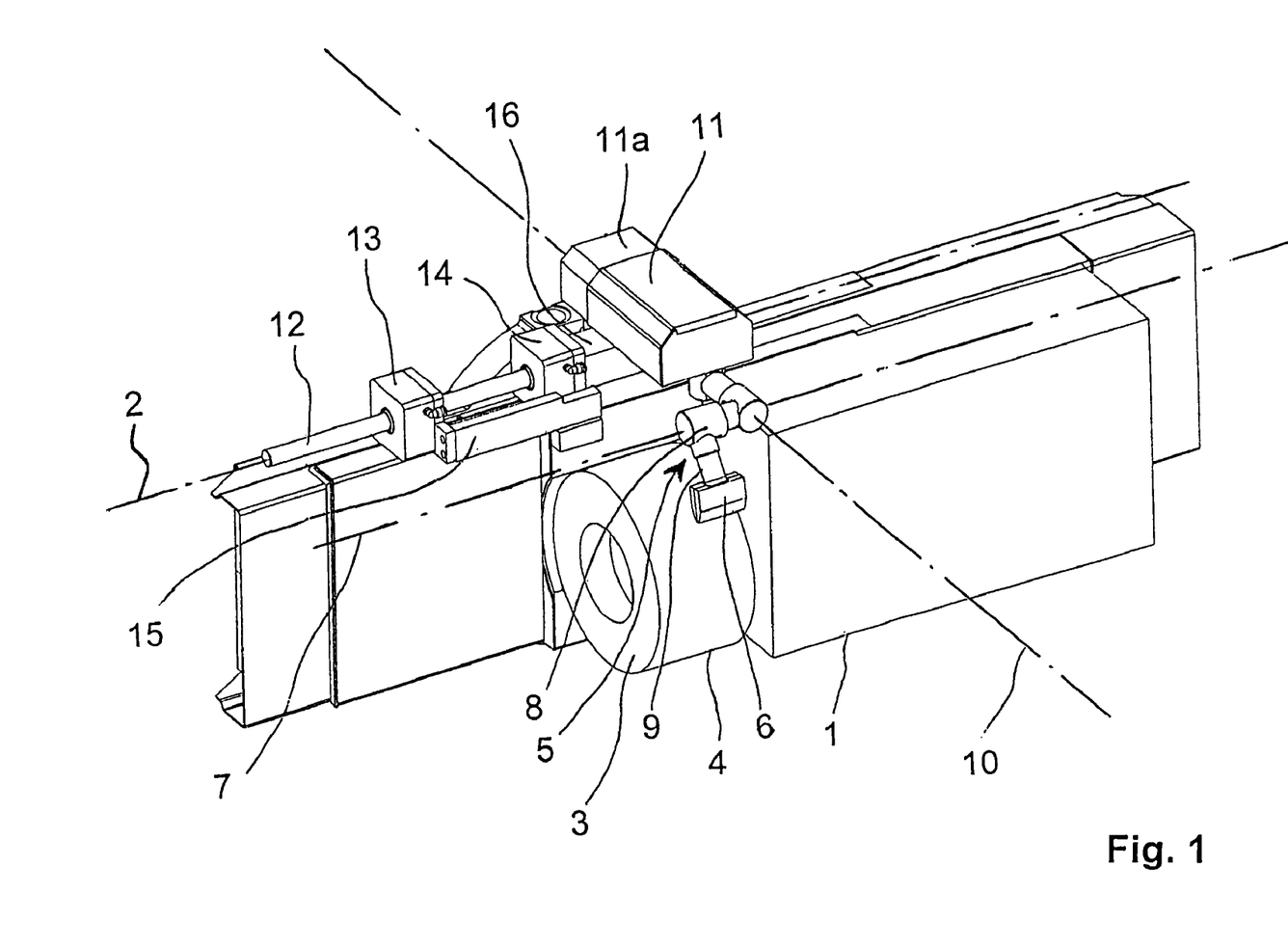
FIG. 1 represents a perspective view of a first embodiment with a first and a second function-supporting unit.

In the illustration of a part of a machine tool which is shown in perspective in FIG. 1, a first function-supporting unit in the form of a first carriage 1 is constrained so that, in relation to a machine base which is not shown in FIG. 1, the first carriage can move along a first axis of linear movement which runs parallel to an axis 2 that is indicated in FIG. 1. The movement of the carriage 1 along this first axis of movement if effected by a first displacement-actuator unit not shown in detail in FIG. 1, which is powered by a drive motor (likewise not shown) that is responsive to controls and is formed by a servo motor. The first carriage 1 holds a tool 3 connected to a rotary drive, for example in the form of a gear-grinding worm, whose axis of rotation runs parallel to the axis 2.

The machine tool according to FIG. 1 further has a second function-supporting unit in the form of a second carriage 11 which is constrained in a way that allows movement of the second carriage 11 relative to the base of the machine along a second axis of linear movement that extends parallel to an axis 10 which is orthogonal to the axis 2.

Figure 1A:
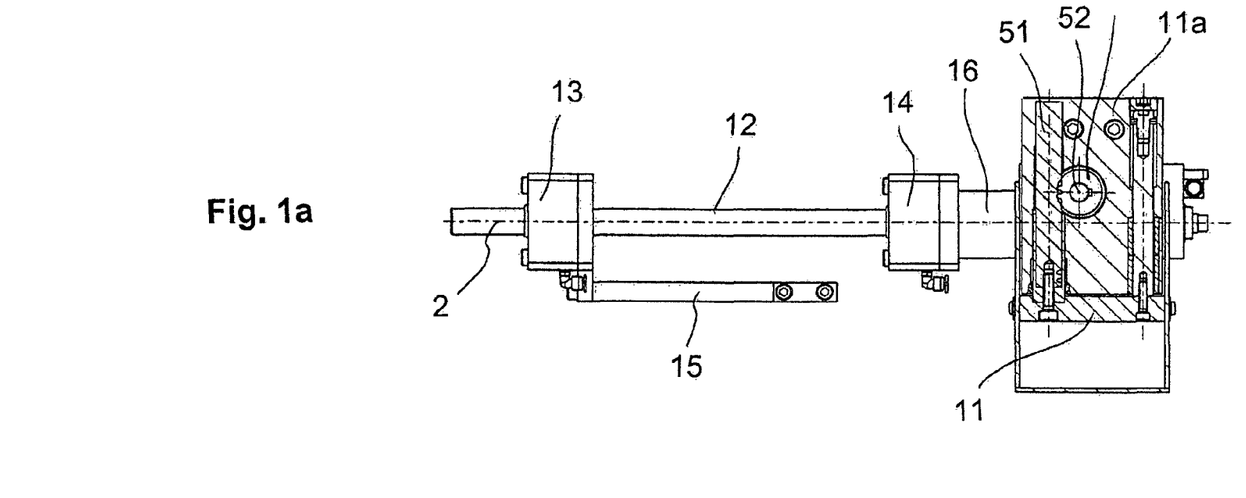
FIG. 1(a) represents a plan view of the second function-supporting unit and its displacement-actuator unit as seen from vertically above, shown partially in a sectional view.
Figure 1B:
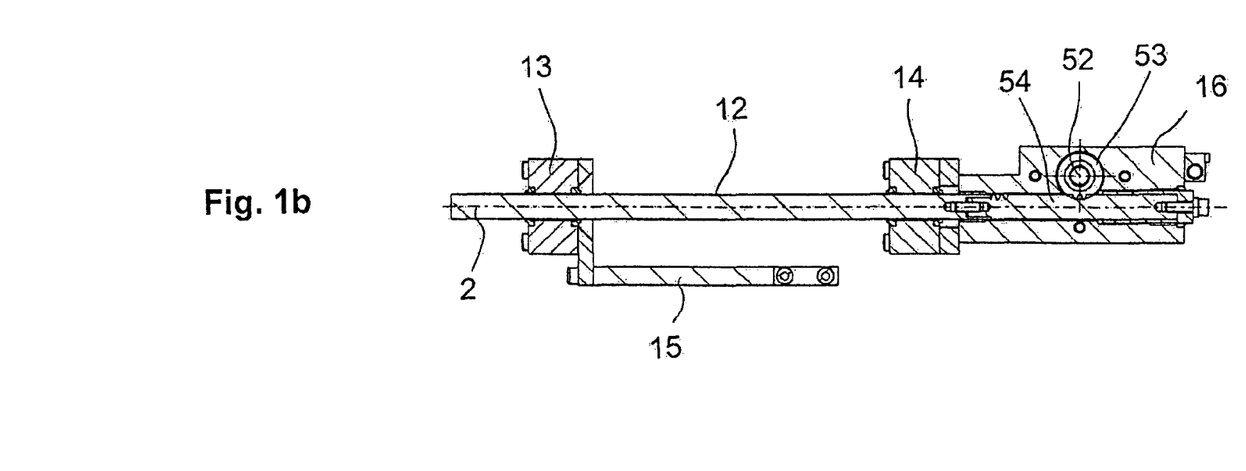
FIG. 1(b) represents a view analogous to FIG. 1(a) in a section plane through the displacement-actuator unit.

As is further evident from FIGS. 1a and 1b, wherein the axes 2 and 10 run parallel to the respective drawing planes, seen together with FIG. 1, the movement of the carriage 11 along its axis of linear movement parallel to the axis 10 is driven by a pinion gear 50 that meshes with a rack 51 which is arranged on the carriage 11. The pinion 50 is seated with a rotationally fixed connection on the upper end (relative to FIG. 1) of a shaft 52 which is rotatably constrained in a bearing block 11a which is stationary in relation to the base of the machine. At the lower, opposite end from the pinion 50, the shaft 52 carries a lower pinion 53, which is seated on the shaft with a rotationally fixed connection and meshes with a rack section 54 of a rigid rod 12 that extends along the axis 2 which is parallel to the axis of linear movement of the first carriage 1.

The rigid rod 12 together with a first coupler unit 13, a second coupler unit 14, the shaft 52, the pinions 50, 53, and the rack 51 forms a second displacement-actuator unit for the second function-supporting unit 11. Each of the two coupler units 13, 14 has a switch-controlled clamping element centered about the axis 2, with the rigid rod 12 extending through the clamping elements. If one of the coupler units 13, 14 is switched to its engaged condition, the rod 12 is immovably locked into the engaged clamp. If one of the coupler units 13, 14 is switched to its disengaged condition, the rod 12 is free to move in its axial direction relative to the disengaged clamp.

The first coupler unit 13 is rigidly connected to the first carriage 1 through a connector part 15. The second coupler unit 14 is rigidly connected to a housing 16 which, in turn, is rigidly connected to the bearing block 11a. The rack section of the rigid rod 12 extends through the housing 16 where it meshes with the lower pinion 53 of the shaft 52 which extends from the lower plane shown in FIG. 1b to the upper plane shown in FIG. 1a.

When the first coupler unit 13 is switched to its engaged state, the rod 12 therefore shares the linear movement of the first carriage 1 and through its rack section sets the shaft 52 into rotation which, in turn, imparts a corresponding linear displacement along the axis 10 on the second carriage 11 which forms the second function-supporting unit. In this way, the section of the rod 12 that is located in the area of the first coupler unit 13 forms the drive-input section, and the section of the rod 12 that is located in the area of the housing 16 forms the drive-output section of the second displacement-actuator device of the second function-supporting unit.

The second coupler unit 14 is switched on and off in the opposite sense of the first coupler unit 13. Consequently, when the first coupler unit 13 has been switched to the engaged state and thereby causes the respective movements of the first function-carrying unit and the rod 12 to be locked to each other, the second coupler unit 14 is in the disengaged state. After the second function-supporting unit has been set to its desired position as a result of being taken along in this movement, the first coupler unit 13 is switched to its disengaged state. Complementary to this disengagement, the second coupler unit 14 changes to its engaged state, whereby the rod 12 is immobilized relative to the housing 16 and the second function-supporting unit 11 is secured in its set position.

The second displacement-actuator unit, in particular the rigid rod 12, can carry a reference mark which is recognized by a reference mark sensor when it moves past the latter. Based on the detection signal of the reference mark sensor, an electronic controller receives sufficient information to calculate the position of the second function-supporting unit 11 at a current moment. This allows a display indication of the current position or also an automatic position-setting of the second function-supporting unit 11 to be implemented.

The switching of the coupler units 13, 14 between their respective engaged and disengaged states can be accomplished for example through hydraulic, pneumatic, or electromagnetic actuation under the control of a suitable controller unit.

A coolant nozzle 6 is arranged by means of a fastener section 5 on the second carriage 11 which forms the second function-supporting unit, whereby a jet of liquid coolant can be directed at the circumference 4 of a tool 3. With the linear displacement path of the second carriage 11 extending parallel to the axis 10, it is thus possible to set the radial distance of the coolant nozzle 6 from the circumference 4 of the tool 3.

As an alternative, this setting could also be made in such a way that the fastener section 5 has a part 8 extending along and designed to be rotatable about an axis 7 parallel to the axis 2. The resultant freedom of angular displacement of the part 8 about the axis 7 allows adjustment of the angular position of the coolant nozzle 6 which is arranged on a carrier arm 9 projecting radially from the part 8. This allows in particular an adjustment of the direction under which the coolant stream meets the circumference 4 of the tool 3.

To drive the rotary movement of the part 8, the latter could for example have a rotationally fixed connection to one end of a shaft which extends along the axis 7 and whose other end carries a bevel gear meshing with another bevel gear which is arranged with a rotationally fixed connection on a shaft extending along the axis 10 that runs at a right angle to the axis 7. The latter shaft can be rotationally constrained in a component that is stationary relative to the base of the machine and is for example analogous to the bearing block 11a, where the shaft can carry a rotationally fixed pinion which meshes with the rack section of the rigid rod 12. When the first coupler unit 13 is switched to its engaged state and thus causes the rod 12 to share the linear movement of the first carriage 1, the rack section of the rod 12 will drive the shaft that extends along the axis 10, whereby the part 8 is subjected to a corresponding rotary displacement about the axis 7.

Figure 2:
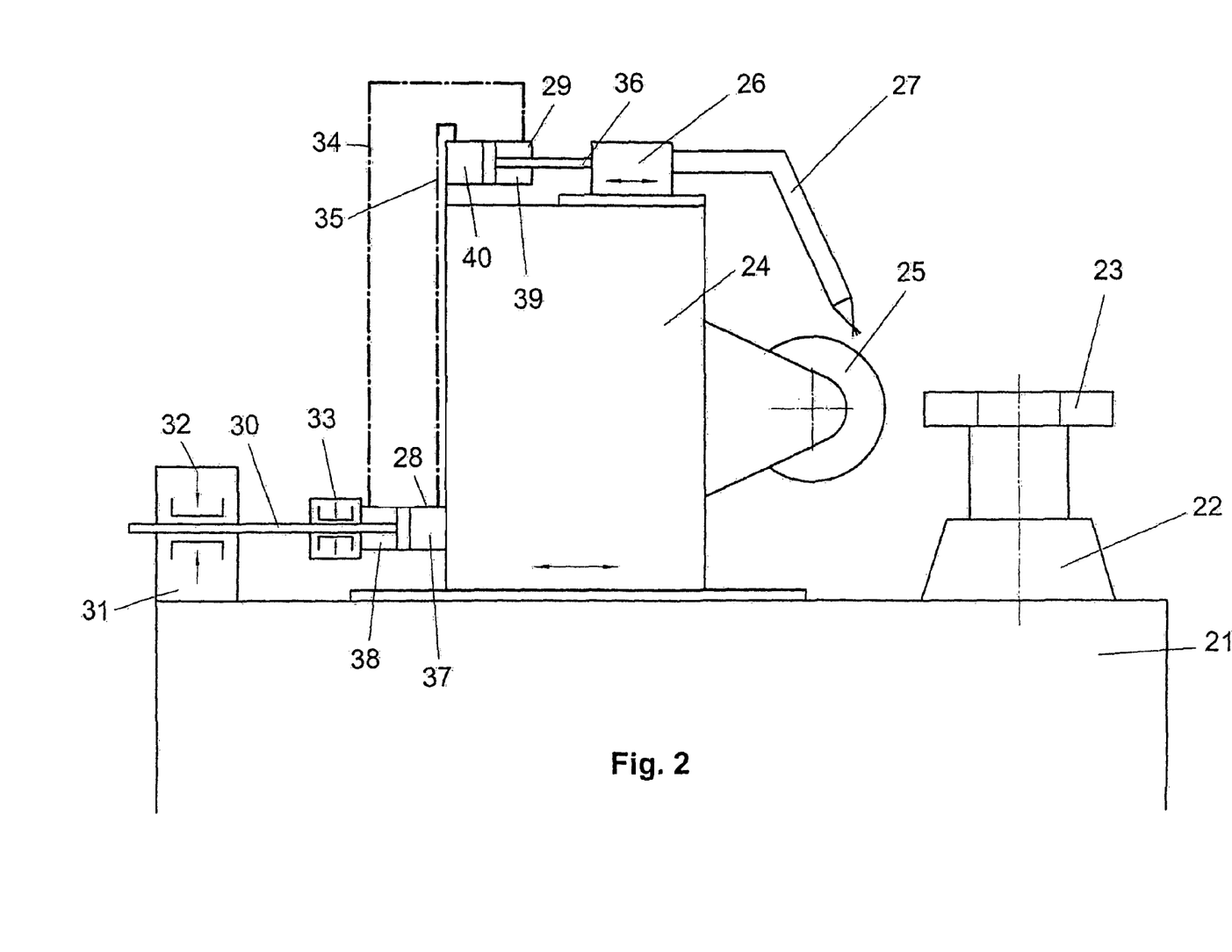
FIG. 2 represents a sectional view of a second embodiment.

The machine tool which is shown in FIG. 2 in a schematic view from the side has a base 21 on which a work piece carrier 22 is mounted on which a work piece 23 is arranged, for example a gear. On the base 21 there is further a tool-holding carriage 24 arranged as a first function-supporting unit whose distance relative to the work piece carrier 22 is variable. The first displacement-actuator unit which belongs to the tool-holding carriage 24 is not shown in FIG. 2. The tool-holding carriage 24 holds a tool 25, for example a grinding wheel, a shaving cutter wheel, or the like. As a second function-supporting unit, a function-supporting carriage 26 is supported on the tool-holding carriage 24 in a manner that allows the function-supporting carriage 26 to move parallel to the displacement direction of the tool-holding carriage 24 which represents the first axis of movement. The function-supporting carriage 26 supports a function-supporting unit 27, for example a coolant nozzle.

In this embodiment, the function-supporting unit 27 is required to take a specific position relative to the work piece 23 independent of the movements of the tool-holding carriage 24. To achieve this purpose, a hydraulic coupler is provided as the second displacement-actuator unit between the tool-holding carriage 24 and the function-supporting carriage 26. This hydraulic coupler comprises a first hydraulic cylinder 28 attached to the tool-holding carriage 24 and a second hydraulic cylinder 29 attached to the function-supporting carriage 26, with the cylinders having equal internal diameters. The piston rod 30 belonging to the first hydraulic cylinder 28 is slidably guided in a bearing mount 31 that is installed on the base 21 of the machine.

On the bearing mount 31 and on the hydraulic cylinder 28 are arranged, respectively, a first and a second clamping element 32, 33 of a first and a second coupler unit, which are switchable in mutually opposite ways, so that the piston rod 30 is locked either to the bearing mount 31 or to the first hydraulic cylinder 28. The piston rod 36 that belongs to the second hydraulic cylinder 29 is attached to the function-supporting carriage 26. The two chambers of the first hydraulic cylinder 28 which are separated from each other by the piston are connected, respectively, through two conduits 34, 35 to the two chambers of the second hydraulic cylinder 29.

When the machine tool is in operation, the second clamping element 33 is deactivated, i.e., the second coupler unit is switched to the disengaged state, while the first clamping element 32 is activated so that the first coupler unit is in the engaged state, whereby the piston rod 30 is locked to the bearing mount 31 and thus to the base 21, but is free to move relative to the first hydraulic cylinder 28. When the tool-holding carriage 24 is advanced, i.e., moves to the right, the right-hand chamber 37 of the first hydraulic cylinder 28 is expanded while the left-hand chamber 38 is reduced in volume. This has the consequence that hydraulic fluid is pushed through the first conduit 34 into the right-hand chamber 39 of the second hydraulic cylinder 29, while hydraulic fluid is pushed from the left-hand chamber of the hydraulic cylinder 29 through the second conduit 35 into the right-hand chamber 37 of the hydraulic cylinder 28. Since the hydraulic fluid is an incompressible liquid, the fluid quantities which are displaced from the two hydraulic cylinders 28 and 29 through the movement of the tool-holding carriage 24 are identical. Given that the two hydraulic cylinders 28 and 29 are of the same diameter, the strokes of the pistons in the two hydraulic cylinders 28, 29 are likewise identical. In the illustrated arrangement, this has the consequence that the displacements of the tool-holding carriage 24 and the function-supporting carriage 26 have the same magnitude but opposite directions. This means that the function-supporting carriage 26 and with it the function unit 27 will not change their position relative to the base 21 and thus to the work piece 23, when the tool-holding carriage 24 is moving to the right. If the tool-holding carriage 24 is moved to the left, hydraulic fluid is expelled from the first hydraulic cylinder 28 through the second conduit 35, while fluid is pulled into the first hydraulic cylinder 28 through the first conduit 34. Consequently, the function-supporting carriage 26 moves to the right relative to the tool-holding carriage 24 by an equal distance as the tool-holding carriage 24 moves to the left, and as a result the function-supporting carriage 26 does not change its position relative to the base 21.

As has been explained above, the hydraulic coupler between the function-supporting carriage 26 and the tool-holding carriage 24 serves the purpose of maintaining a given position of the function unit 27 relative to the work piece 23 independently of the movement of the tool-holding carriage 24. When the work piece 23 to be processed is exchanged for a work piece with different dimensions, it can become necessary to set the function unit 27, for example a coolant nozzle, in a new position relative to the work piece 23. To accomplish this purpose, the second clamping element 33 is closed, so that the piston rod 30 is rigidly connected to the first hydraulic cylinder 28, while the first clamping element 32 is opened, so that the piston rod 30 is free to move relative to the bearing mount 31. The tool-holding carriage 24 is now moved by means of its associated displacement-actuator unit. Since the piston rod 30 is rigidly connected to the first hydraulic cylinder 28, the volumes of its two chambers cannot change, so that no exchange of hydraulic fluid takes place between the first and second hydraulic cylinders 28, 29. The hydraulic coupler has in this case the effect that the function-supporting carriage 26 moves together with the tool-holding carriage 24. The very precisely working first displacement-actuator unit of the tool-holding carriage 24 can therefore be used to bring the function-supporting carriage 26 and thus the function unit 27 into the position required by the dimensions of the exchanged work piece 23. After the positioning process has been completed, the second clamping element 33 is opened again, while the first clamping element 32 is closed. The hydraulic will again work as described above, so that the displacement distances traveled by the tool-holding carriage 24 and the function-supporting carriage 26 are of opposite direction relative to each other, but of equal magnitude.

Deviating from the embodiment of the foregoing description, the respective internal diameters of the first and second hydraulic cylinders 28 and 29 could also be different from each other. In this case, the relative displacement between the first hydraulic cylinder 28 and its associated piston rod 30 would be different from the relative displacement between the second hydraulic cylinder 29 and its associated piston rod 36. To achieve displacements of equal magnitude of the two carriages 24 and 26 in spite of the different stroke movements of the piston rods 30 and 36, it will be necessary in this case for the piston rod 36, which belongs to the second hydraulic cylinder 29, to be coupled to the function-supporting carriage 26 by way of a transmission mechanism. This transmission mechanism could for example be a gearbox.

Figure 3:
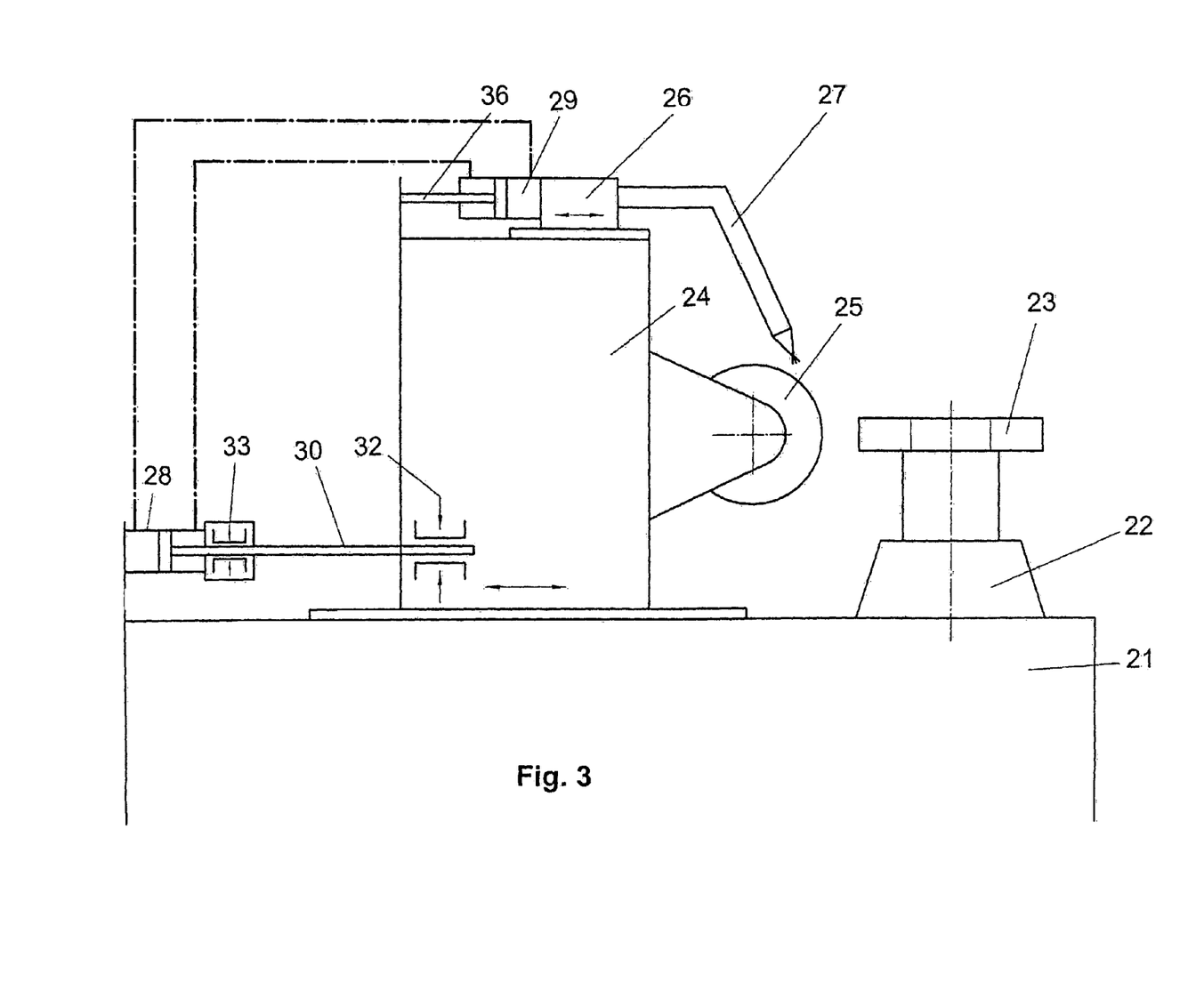
FIG. 3 represents a sectional view of a variation of the embodiment of FIG. 2.

The embodiment of a machine tool that is shown in FIG. 3 differs from the embodiment illustrated in FIG. 2 in that the first hydraulic cylinder 28 is fastened to the base 21 and the first piston rod 30 can be coupled by means of the clamping element 32 to the tool-holding carriage 24, while the second hydraulic cylinder 29 is fastened to the function-supporting carriage 26 and the second piston rod 36 is fastened to the tool-holding carriage 24. This configuration of the hydraulic coupler between the tool-holding carriage 24 and the function-supporting carriage 26 ensures likewise that a given position of the function unit 27 relative to the base 21 is maintained independently of the movement of the tool-holding carriage 24. A change of the relative positioning between the function unit 27 and the base 21 in order to adapt the arrangement to the work piece 23 that is to be processed can be carried out in the same way as for the embodiment of FIG. 2.

LIST OF REFERENCE SYMBOLS 1 first function-supporting unit/carriage
2 axis
3 tool
4 circumference
5 fastener section
6 coolant nozzle
7 axis
8 part of 5
9 carrier arm
10 axis
11 second function-supporting unit carriage
11a bearing block
12 rigid rod
13 first coupler unit
14 second coupler unit
15 connector part
16 housing
21 base (of machine tool)
22 work piece carrier
23 work piece
24 tool-holding carriage
25 tool
26 function-supporting carriage
27 function unit
28 first hydraulic cylinder
29 second hydraulic cylinder
30 piston rod
31 bearing mount
32 first clamping device
33 second clamping device
34, 35 conduits
36 piston rod
37 right chamber
38 left chamber
39 right chamber
40 left chamber
50 pinion gear
51 rack
52 shaft 53 lower pinion gear
54 rack section While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. Machine tool with a base, said machine tool comprising:
a first and a second axis of movement (2, 7),
a first function-supporting unit (1; 24) which by means of a first displacement-actuator unit powered by a drive motor responsive to controls is enabled to move relative to the base in accordance with a first displacement path corresponding to the first axis of movement (2),
a second function-supporting unit (5; 26) which by means of a second displacement-actuator unit is enabled to move in accordance with a second displacement path corresponding to the second axis of movement (7),
wherein the second displacement-actuator unit comprises a first coupler unit (13; 32) which can be switched between an engaged and a disengaged state, said second displacement-actuator unit also comprises a drive-input section which in the engaged state of the first coupler unit (13; 32) is enabled to be driven by the movement of the first function-supporting unit (1; 24) as the latter is being moved along a displacement path corresponding to the first axis of movement, and said second displacement-actuator unit further comprises a drive-output section which is driven by the drive-input section and which drives the movement of the second function-supporting unit (5; 26) along its second displacement path.

2. Machine tool according to claim 1 wherein the first axis of movement (2) is an axis of linear movement.

3. Machine tool according to claim 1 wherein the second displacement-actuator unit comprises a second coupler unit (14; 33) which can be switched in the opposite sense of the first coupler unit (13; 32) between an engaged state in which the second displacement-actuator unit is locked in place and a disengaged state in which the second displacement-actuator unit is released for driving movement.

4. Machine tool according to claim 2 wherein the drive-input section and the drive-output section of the second displacement-actuator unit are axially spaced-apart portions of a rigid rod (12) whose longitudinal axis runs parallel to the axis (2) of linear movement.

5. Machine tool according to claim 4, characterized in that the first coupler unit (13) comprises a clamping element in which the portion of the rod (12) that forms the drive-input section can be firmly clamped in the engaged condition of the first coupler unit (13).

6. Machine tool according to claim 1 wherein the first coupler unit (13) is held in fixed attachment on the first function-supporting unit (1).

7. Machine tool according to claim 4 wherein the second coupler unit (14) comprises a clamping element in which the portion of the rod (12) that forms the drive-output section can be firmly clamped in the engaged condition of the second coupler unit (14).

8. Machine tool according to claim 3 wherein the second coupler unit (14) is held in fixed attachment on the base.

9. Machine tool according to claim 1 wherein the drive-input section and the drive-output section of the second displacement-actuator unit are each formed by a piston-cylinder unit that is actuated by a pressure medium and whose piston is connected to a piston rod (30, 36) that protrudes from the respective cylinder (28, 29), wherein the chambers separated from each other by the piston in each cylinder are connected to the respective chambers of the other cylinder by pressure-fluid conduits (34, 35) extending between the two piston-cylinder units.

10. Machine tool according to claim 9 wherein the pressure medium that actuates the piston-cylinder units is a hydraulic pressure medium.

11. Machine tool according to claim 9 wherein the piston rod (30) of the piston-cylinder unit that forms the drive-input section extends parallel to the axis of linear movement.

12. Machine tool according to claim 9 wherein the first coupler unit (32) comprises a clamping element in which the piston rod (30) of the piston-cylinder unit that forms the drive-input section can be firmly clamped in the engaged condition of the first coupler unit (32).

13. Machine tool according to claim 9 wherein the piston-cylinder unit that forms the drive-input section is held in fixed attachment on the first function-supporting unit (24) and the first coupler unit (32) is held in fixed attachment on the base (21).

14. Machine tool according to claim 9 wherein the piston-cylinder unit that forms the drive-input is held in fixed attachment on the base (21) and the first coupler unit (32) is held in fixed attachment on the first function-supporting unit (24).

15. Machine tool according to claim 3 wherein the second coupler unit (33) comprises a clamping element in which a piston rod (30) of a piston-cylinder unit that forms the drive-input section can be firmly clamped in the engaged condition of the second coupler unit (33).

16. Machine tool according to claim 15 wherein the second coupler unit (33) is held in fixed attachment on a cylinder (28) of the piston-cylinder unit that forms the drive-input section.

17. Machine tool according to claim 9 wherein the cylinders (28, 29) of the piston-cylinder units which form, respectively, the drive-input section and the drive-output section have equal internal cross-sectional areas.

18. Machine tool according to claim 1 wherein the second axis of movement (10) is an axis of linear movement.

19. Machine tool according to claim 1 wherein the second axis of movement (7) is an axis of rotary movement.

20. Machine tool according to claim 1 wherein a transmission mechanism is arranged between the second function-supporting unit (5) and the drive-output section to change the direction or length of displacement of the drive-output section.

21. Machine tool according to claim 1 wherein a tool (3; 25) is arranged on the first function-supporting unit (1; 24), and a coolant nozzle (6; 27) is arranged on the second function-supporting unit (5; 26).

22. Machine tool according to claim 1 wherein the first function-supporting unit is a first carriage (24) which is constrained on the base (21) in a manner that allows said first carriage (24) to be moved relative to the base (21).

23. Machine tool according to claim 1 wherein the second function-supporting unit is a second carriage (26) which is constrained on the first function-supporting unit (24) in a manner that allows said second carriage (26) to be moved relative to the first function-supporting unit (24).

* * * * *

UNITED STATES PATENT AND TRADEMARK OFFICE
CERTIFICATE OF CORRECTION

| | | |
|---|---|---|
| PATENT NO. | : 7,886,415 B2 | |
| APPLICATION NO. | : 11/820141 | |
| DATED | : February 15, 2011 | |
| INVENTOR(S) | : Johann Mall and Stephan Kadlubski | |

It is certified that error appears in the above-identified patent and that said Letters Patent is hereby corrected as shown below:

On the Title page, item (75),
The name of the second inventor, Stephan Kadlubski, is included under "Inventor".

Signed and Sealed this
Twenty-sixth Day of April, 2011

David J. Kappos
*Director of the United States Patent and Trademark Office*